Aug. 12, 1924.
C. A. BOBER
1,504,540
CLAMP LOCK COMBINATION FOR AUTO HOODS
Filed Dec. 13, 1923
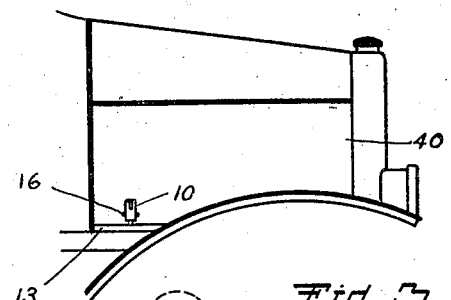
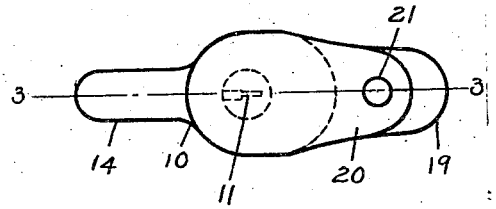
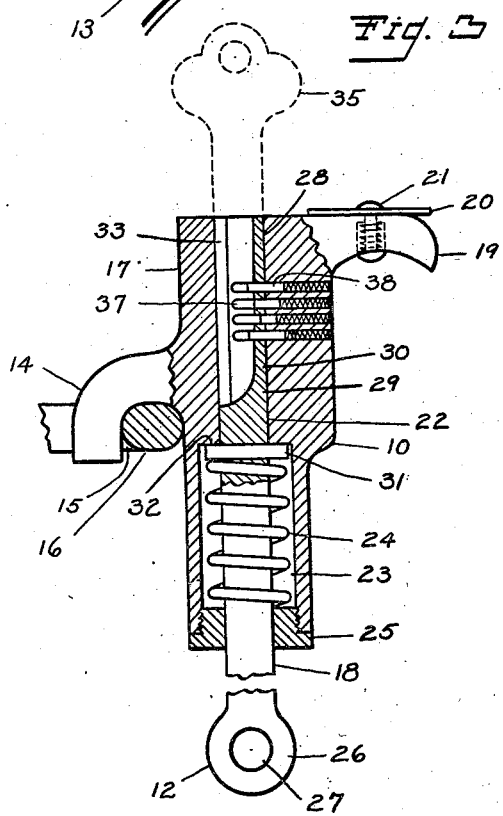
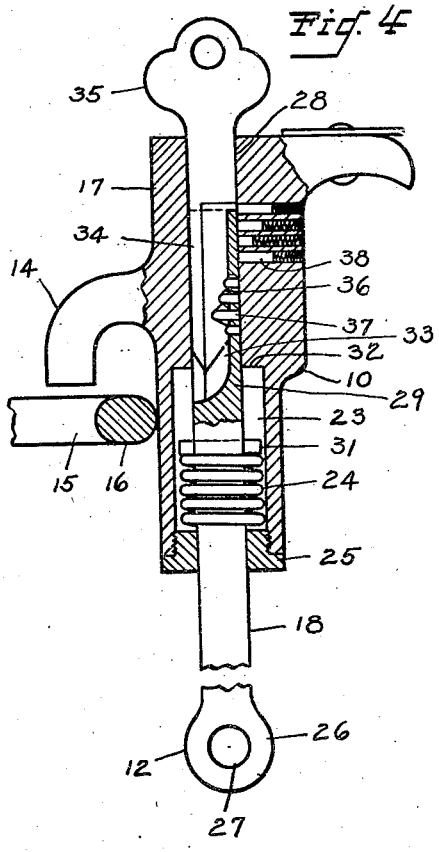
Inventor:
Charles A. Bober.
By Louis M. Schmidt
Atty.

Patented Aug. 12, 1924.

1,504,540

UNITED STATES PATENT OFFICE.

CHARLES A. BOBER, OF NEW BRITAIN, CONNECTICUT, ASSIGNOR OF ONE-HALF TO THOMAS KOBYLAZ, OF NEW BRITAIN, CONNECTICUT.

CLAMP-LOCK COMBINATION FOR AUTO HOODS.

Application filed December 13, 1923. Serial No. 680,336.

*To all whom it may concern:*

Be it known that I, CHARLES A. BOBER, a citizen of Poland, residing at New Britain, in the county of Hartford and State of Connecticut, have invented certain new and useful Improvements in Clamp-Lock Combinations for Auto Hoods, of which the following is a specification.

My invention relates to improvements in clamp-lock combinations for auto-hoods adapted for use with auto-hoods for locking the same in the closed position, operating generally after the manner of the auto-hood lock that is shown and described in my pending application, Serial No. 513,319, filed January 18, 1923, and the object of my improvement is to produce a structure in which the key-operated lock mechanism and the clamp structure are more closely associated and are substantially structurally united and inter-built so as to reduce the number of the structural elements, to simplify the construction, to provide a relatively compact structure, and improve the efficiency and reliability.

In the accompanying drawing:—

Figure 1 is a side elevation of part of the structure of an automobile showing the hood and the adjacent part of the chassis and with a hood-clamp made in accordance with my invention, being in the closed or locked position, and adapted to be released by the use of a key.

Figure 2 is a plan view on an enlarged scale of the hood clamp-lock combination only, the key-hole being covered by the cover-cap.

Figure 3 is a sectional view on the line 3—3 of Fig. 2, with parts in side elevation and parts broken away.

Figure 4 is a similar view with the parts in a different position.

My improved clamp-lock combination for auto-hoods comprises a composite body structure 10 that is vertically elongated and has a keyhole 11 in the top end face, that has its lower end 12 pivotally connected to the chassis 13, and that is provided adjacent the upper end with a laterally directed hook 14. In the locked position the hook 14 is engaged with an opening 15 in an eye piece or lug 16 that is supported from the side wall of the hood 17.

In the unlocked position the hook 14 is raised from the locked position so as to clear the eye piece or lug 16, as is common, and involving relative movement of the two parts of the composite body structure 10, said two parts comprising what may be designated as the upper or outer part 17 and the lower or inner part 18. The hook 14 is on the upper part 17 and the pivotal connection of the lower end mentioned is provided by means of the lower part 18.

The upper part 17 is also provided with a laterally directed handle-lug 19 and may also have a cover-cap 20 for covering the keyhole 11. As a detail, the pivotal connection 21 for said cover-cap 20 may be provided in the form of a yielding spring-plunger device substantially as shown and described in the application mentioned.

In the present instance the upper part 17 is provided with a bore 22 that extends continuously through the same longitudinally from end to end and that has the lower end portion 23 enlarged to provide a spring chamber for the spring 24. An annular screw-cap 25 may serve as a closure for the bottom end of the spring chamber 23.

The lower part 18 has an eye 26 at the lower end that has an opening 27 for the pivotal connection and above said eye 26 is substantially in the form of a continuous, straight rod of uniform and circular form of cross-section and which is a fit for the upper portion 28 of the bore 22.

Said rod or body portion 29 of the lower part 18 projects upwardly through the end-cap or screw-cap 25, through the spring chamber 23, and into the upper portion 28 of the bore 22, said upper portion 28 and the adjacent upper end portion 30 of the rod 29 being adapted to cooperate as cylinder and plunger.

The spring 24 tends to pull the upper part 17 downwardly and the upper part is lifted in opposition to said spring 24. The lower end of the spring 24 abuts against the cap 25 and the upper end cooperates with a diametral pin 31 that projects through the rod 29. In the closed and locked position the upper face of the pin 31 may be seated against the opposed top wall or roof 32 of the spring chamber, the effect thereof being to limit the closing movement of the upper part 17 and the lower part 18 that is effected through the medium of the spring 24. That is to say, the pin 31 serves as a limiting stop for limiting the relative movement of the parts.

The upper end portion 30 of the rod 29 serves in the present instance as the barrel member of the key-operated locking mechanism, the keyhole 11 mentioned being provided therein in the form of a narrow longitudinally directed slot 33 that is a fit for the flat blade portion 34 of the key 34. Said locking mechanism is represented conventionally and may be briefly designated as follows:—

The key 35 has the active edge portion 36 of undulating form for cooperating with the opposed set 37 of inner tumblers that are housed for longitudinal movement in the barrel member 30 and which tumblers mate individually with a set 38 of spring tumblers that are housed in the structure of the upper part 17.

After the key has been inserted and the parts brought into registration the devices are in unlocked position or condition so that free relative movement of the upper part 17 and the lower part will be permitted.

The locking and unlocking are effected substantially in the same manner as with a Yale lock of standard form.

I claim as my invention:—

A clamp-lock combination for auto-hoods comprising an upper part and a lower part telescopically connected together and having a spring that tends to draw said parts together to the closed position, said upper part having a bore and a portion of said lower part fitting and operatively housed within said bore, key operated locking mechanism comprising spring tumblers, and said spring tumblers being operatively housed in opposed and adjacent portions of the wall of said bore and said portion of the lower part.

CHARLES A. BOBER.